United States Patent [19]

Hayashi et al.

[11] Patent Number: 4,721,494
[45] Date of Patent: Jan. 26, 1988

[54] DRIVE TRANSMISSION STRUCTURE FOR TRACTOR

[75] Inventors: Tetsuaki Hayashi, Osaka; Hiroshi Itatani, Sakai; Niro Bando, Sakai; Mikio Yuki, Sakai; Nobuyuki Yamashita, Sakai; Hiroyuki Ogasawara, Izumi; Mitsuaki Miyata, Sakai; Kazuaki Kurohara, Sakai; Fumihiro Ikeda, Osaka; Yutaka Nakata, Sakai, all of Japan

[73] Assignee: Kubota, Ltd., Osaka, Japan

[21] Appl. No.: 862,477

[22] Filed: May 12, 1986

[30] Foreign Application Priority Data

Sep. 2, 1985 [JP] Japan ............... 60-134312[U]
Dec. 27, 1985 [JP] Japan ............... 60-202715[U]
Jan. 9, 1986 [JP] Japan ............... 61-1515[U]
Jan. 9, 1986 [JP] Japan ............... 61-1516[U]

[51] Int. Cl.$^4$ ............................................. F16H 7/02
[52] U.S. Cl. ........................................ 474/88; 56/11.3; 74/478; 192/13 A
[58] Field of Search ............... 474/84, 86, 88, 89; 192/3 S, 13 A, 12 R; 56/11.3; 74/478, 529

[56] References Cited

U.S. PATENT DOCUMENTS

| | | | |
|---|---|---|---|
| 1,569,612 | 1/1926 | Burrows | 74/529 |
| 1,864,881 | 6/1932 | Abel | 74/529 |
| 3,319,731 | 5/1967 | Kenkel | 474/86 |
| 3,895,697 | | | 74/529 |
| 4,037,695 | 7/1977 | Welck | 192/13 R |
| 4,248,331 | 2/1981 | Behrens | 192/17 R |
| 4,285,419 | 8/1981 | Anderson | 56/11.3 |
| 4,291,778 | 9/1981 | Slazas | 74/529 |
| 4,310,082 | 1/1982 | Elmy et al. | 192/11 |

*Primary Examiner*—James A. Leppink
*Assistant Examiner*—Terry Lee Melius
*Attorney, Agent, or Firm*—Gifford, Groh, VanOphem, Sheridan, Sprinkle and Dolgorukov

[57] ABSTRACT

A drive transmission structure for a tractor comprising a belt drive system for transmitting power from an engine output shaft to a transmission having a brake mechanism. The belt drive system includes a belt type stepless change speed mechanism having a split pulley assembly and a swing device for swinging the split pulley assembly toward the engine output shaft and the transmission, a first belt for transmitting the power from the engine output shaft to the split pulley assembly, and a second belt for transmitting the power from the split pulley assembly to the transmission. The pulley assembly defines two split pulley sections for engaging the first and second belts, respectively. A control device is provided to change power transmission ratios by actuating the swing device. Further, a tension pulley type clutch mechanism is provided to act on the first belt or the second belt. The brake mechanism and the tension pulley type clutch mechanism are controlled by the clutch and brake control mechanism.

5 Claims, 11 Drawing Figures

DRIVE TRANSMISSION STRUCTURE FOR TRACTOR

BACKGROUND OF THE INVENTION

The present invention relates to a drive transmission structure for a tractor comprising a belt type stepless change speed mechanism between an engine and a transmission.

The belt type stepless change speed mechanism employed in this type of drive transmission structure for an agricultural tractor includes two split pulleys one of which engages a belt extending from the engine and the other engages a belt extending to the transmission. The two split pulleys are shiftable toward the engine or toward the transmission, to relax tension of one of the belts and increase the pitch circle diameter of one of the split pulleys and to increase tension of the other belt and reduce the pitch circle diameter of the other split pulley. This provides belt type stepless speed changing.

Further, by shifting the split pulleys to an end of their shifting range, one of the belts is relaxed to be out of contact with a V-groove whereby power transmission is broken. In other words, this construction acts as a clutch as well.

However, since the split pulleys function as a main clutch at the end of their shifting range, the split pulleys must move through change speed positions to arrive at the end of the shifting range to provide a disengaged state of the main clutch. This feature is unsatisfactory from the point of view of operating speed; it is not well adapted to occasions needing to stop the tractor suddenly.

SUMMARY OF THE INVENTION

The object of the present invention is to realize speedy clutch operations by means of a rotational modification of the above-noted construction.

In order to achieve this object, a drive transmission structure for a tractor according to the present invention comprises a split pulley assembly in a belt drive system between an engine and a transmission case, the split pulley assembly including one inner pulley member and two outer pulley members. A belt extending from the engine is held between the inner pulley member and one of the outer pulley members, and a belt extending to the transmission case is held between the inner pulley member and the other outer pulley member. This pulley assembly is shiftable back and forth along a direction in which the belts extend. This changes the pitch circle diameters of split pulley sections engaging the two belts, thereby to change the transmission ratio of the belt drive. The construction according to the invention further includes a tension pulley type main clutch mechanism which acts on one of the belts.

This invention has been made having regard to the fact that, in this type of belt transmission structure, power transmission is broken by greatly relaxing belt tension. Thus, a tension pulley mechanism is newly added to the structure to vary the belt tension. The structure now has the clutch function which is performed without involving a change speed operation by shifting the pulley mechanism away from one of the belts.

Unlike the prior art construction, the present invention effects clutch operations without going through the change speed positions. Therefore, the clutch may be disengaged instantaneously which is particularly useful on occassions needing to stop the tractor suddenly and permits a braking mechanism to work speedily and effectively. Moreover, it is possible with the prior art construction that the belt having grown long and slack after a long period of use comes off the pulley when the clutch is disengaged. The present invention can avoid such an inconvenience by taking the elongation of the belt into account and setting a shifting range of the split pulley assembly so as to prevent the belt from coming off the pulley. This is an effect produced by the clutch mechanism provided independently of the split pulley assembly.

Other advantages of the present invention, particularly the advantages of control mechanisms for the brake mechanism, clutch mechanism and change speed mechanism, will be apparent from the embodiment to be described hereinafter.

DESCRIPTION OF THE PREFERRED EMBODIMENT

Figure 1:
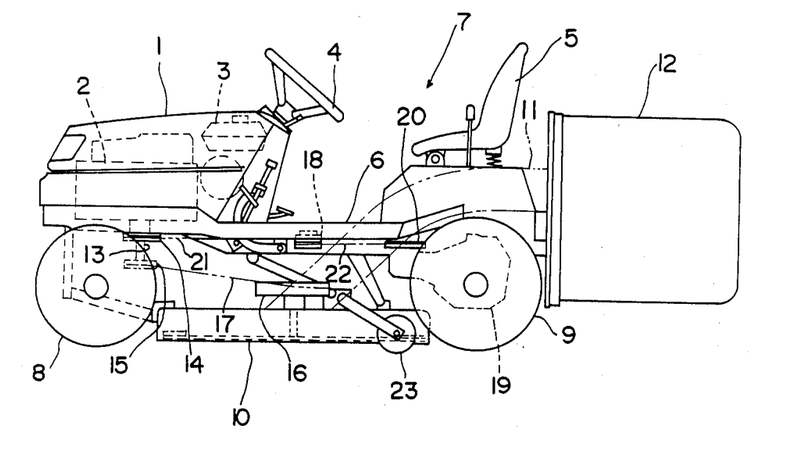
FIG. 1 is a side elevation of a tractor equipped with a drive transmission structure according to the present invention.

Referring to FIG. 1, a lawn tractor shown therein comprises a hood 1 provided at the front of a tractor body and enclosing an engine 2 and a fuel tank 3, and a driver's section 7 provided at a rear portion of the tractor body and including a steering wheel 4, a driver's seat 5 and right and left flat decks 6, with the tractor body supported by front wheels 8 and rear wheels 9. The tractor further comprises a cutting unit 10 mounted between the front wheels 8 and the rear wheels 9, a discharge duct 11 extending rearwardly from the cutting unit 10 and through a space between the right and left rear wheels 9, and a grass catcher 12.

The tractor has a drive transmission mechanism including a downwardly extending output shaft 13 of the engine 2 and an upper and a lower output pulleys 14 and 15 mounted on the output shaft 13. The part of the drive transmission mechanism related to the working implement or cutting unit 10 includes a belt 17 interconnecting the lower output pulley 15 and an input pulley 16 mounted on an input shaft of the cutting unit 10. The part of the drive transmission mechanism related to the propelling system of the tractor includes an input pulley 20 of the transmission case 19 connected by means of belts 21 and 22 to the upper output pulley 14 through a stepless change speed mechanism 18 for driving the rear wheels 9 journaled at a bottom of the transmission case 19.

Figure 2:
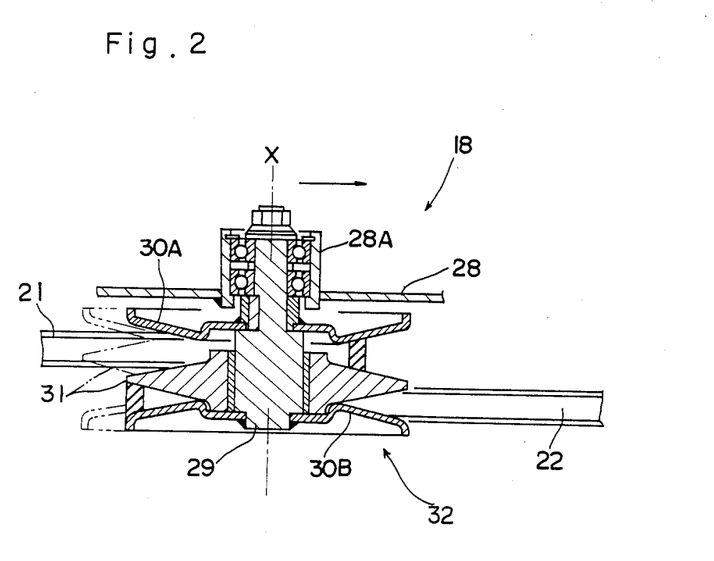
FIG. 2 is a view in vertical section of a stepless change speed mechanism.
Figure 3A:
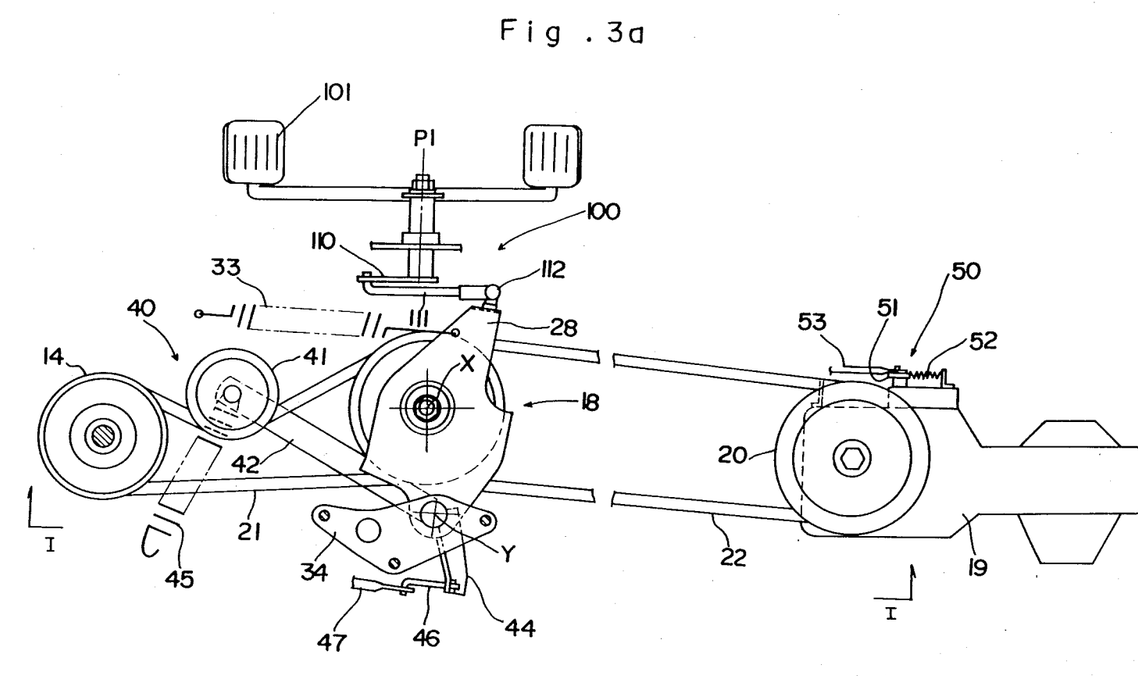
FIG. 3a is a plan view showing control arrangements for the stepless change speed mechanism and a clutch mechanism.
Figure 3B:
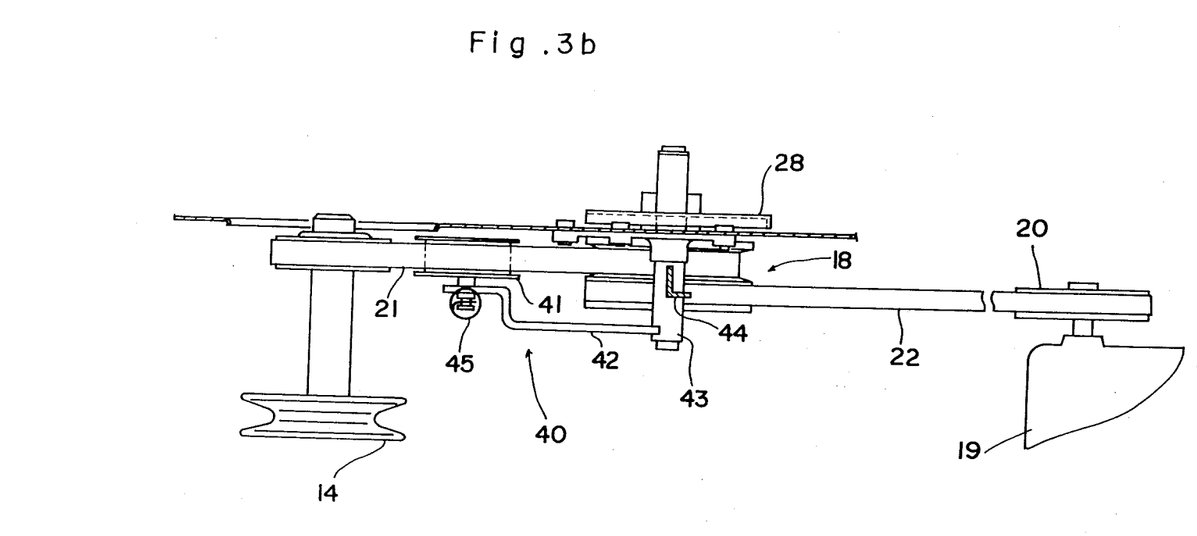
FIG. 3b is a side view on line I—I of FIG. 3a, FIG. 4a is a perspective view of a control mechanism for the stepless change speed mechanism.

Referring to FIGS. 2 and 3, the stepless change speed mechanism 18 comprises a swing plate 28 horizontally swingable on a vertical axis Y and including a boss 28A, a rotary shaft 2 extending downwardly from the boss 28A, and a split pulley assembly attached to the rotary shaft 29 and including an upper outer pulley member 30A, a lower outer pulley member 30B and an inner pulley member 31. The outer pulley members 30A and 30B are fixed to the rotary shaft 29, and the inner pulley member 31 is slidable along an axis X of the rotary shaft 29 between the two outer pulley members 30A and 30B. The upper outer pulley member 30A and the inner pulley member 31 together define a V-groove space for holding the belt 21 extending from the engine 2. The lower outer pulley member 30B and the inner pulley member 31 together define a V-groove space for holding the belt 22 extending to the transmission case 19. A swing of the swing plate 28 in a direction indicated by an arrow in FIG. 2 (toward the transmission case 19) causes the inner pulley member 31 to slide downward, the upper belt 21 to move radially inwardly of the V-groove space and the lower belt 22 to move radially outwardly of the V-groove, whereby the tractor is accelerated. A swing of the swing plate 28 in the opposite direction results in deceleration of the tractor.

Figure 4A:
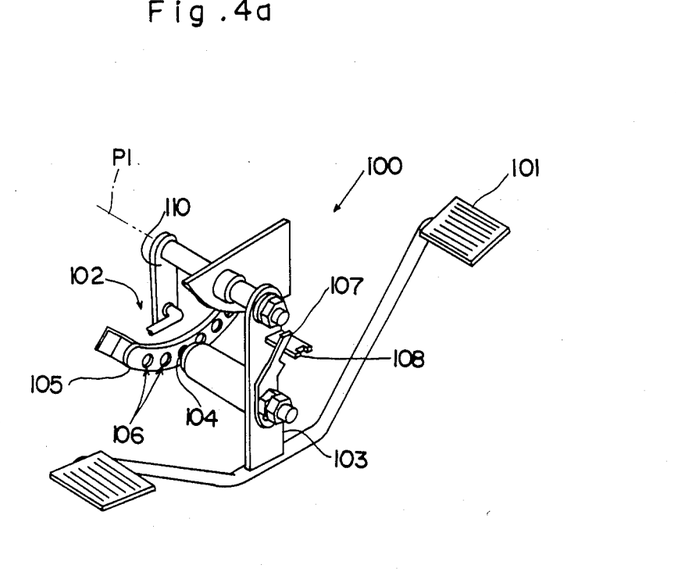
Figure 4B:
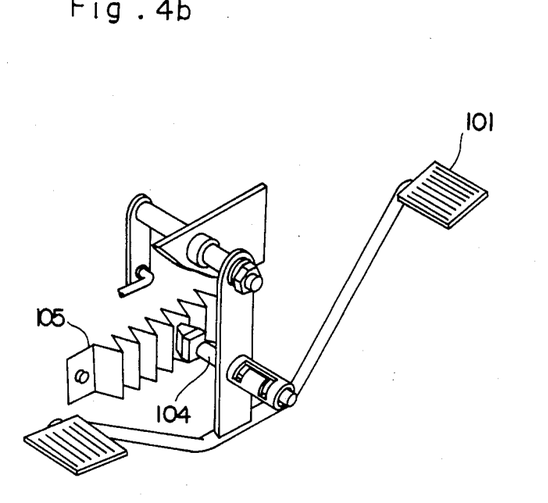
FIG. 4b is a perspective view of a modified control mechanism for the stepless change speed mechanism.
Figure 5:
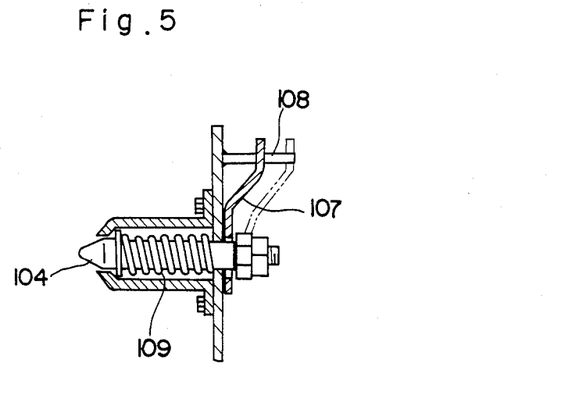
FIG. 5 is an enlarged sectional view of an engaging member mounting portion of the control mechanism.

A control means 100 for operating the stepless change mechanism 18 will be described next. As shown in FIGS. 3a and 4a, a foot pedal 101 which is an example of manual change speed controller is provided on a righthand side of the driver. The foot pedal 101 is supported through a pedal arm 103 to be oscillatable on a horizontal axis P1. The other end of the axis P1 is operatively connected to the swing plate 28 through a link mechanism. The pedal arm 103 carries an engaging member 104 having a conical head and urged by a spring 109 to a projecting position as shown in FIG. 5. A guide member 105 having an arc shape that follows a moving track of the head of the engaging member 104 is attached to the tractor body, the guide member 105 defining a plurality of receiving recesses 106. Under the urging force of the spring 109 the engaging member 104 resiliently engages the receiving recesses 106 of the guide member 105 to maintain the foot pedal 101 in selected positions.

The engaging member 104 is moved to a position retracted from the guide member 105 and is held in that position by operating a switch lever 107 into engagement with a lock element 108. In this position the resilient engagement between the engaging member 104 and the guide member 105 is broken to permit free operation of the foot pedal 101.

The guide member 105 may have a different construction to the one described above. One such example is shown in FIG. 4a wherein the guide member 105 comprises a spring steel plate formed into an accordion shape. Then resilience of the guide member 105 per se may be utilized for engagement purposes.

The link mechanism 102 for operatively connecting the foot pedal 101 to the swing plate 28 includes a link arm 110 oscillatable in unison with the pedal arm 103 on the horizontal axis P1, a connecting rod 111 connected at one end thereof to a free end of the link arm 110, and a ball joint 112 connecting the other end of the connecting rod 111 to the swing plate 28. A depression of the foot pedal 101 causes the swing plate 28 to horizontally swing against the urging force of a spring 33 to accelerate the tractor.

A clutch mechanism 40 will be described next referring to FIGS. 3a and 3b. A tension pulley 41 is fixed to an extreme end of a long arm 42 extending from a boss 43 disposed under the deck 6 to be rotatable on the vertical axis Y. The tension pulley 41 is swingable on the vertical axis Y under the urging force of a spring 45 to act on and increase tension of the belt 21 extending between the output pulley 14 and the stepless change speed mechanism 18. The boss 43 further carries a short arm 44 which in turn carries a coupling piece 46 at a free end thereof to be operatively connected through a connecting member 47 such as a wire or rod to a clutch and brake control mechanism 60 to be described later. When the coupling piece 46 is pulled, the tension pulley 41 retracts against the urging force of the spring 45 in a direction to relax the tension of the belt 21, whereby the clutch mechanism 40 assumes a disengaged position. Reference number 34 denotes a bracket attached to a support below the deck 6 for supporting the split pulley assembly 32 and the clutch mechanism 40.

A brake mechanism 50 provided in the transmission case 19 will be described next. The brake mechanism 50 is mounted inwardly of the transmission case 19 and includes a control arm 51 operatively connected to the clutch and brake control mechanism 60 through a connecting member 53 such as a wire or rod. The control arm 51 normally is retained in a brake release position by the urging force of a spring 52. When the connecting member 53 is pulled, the control arm 52 is pivoted to a braking position against the urging force of the spring 52 thereby applying the brakes.

Figure 6:
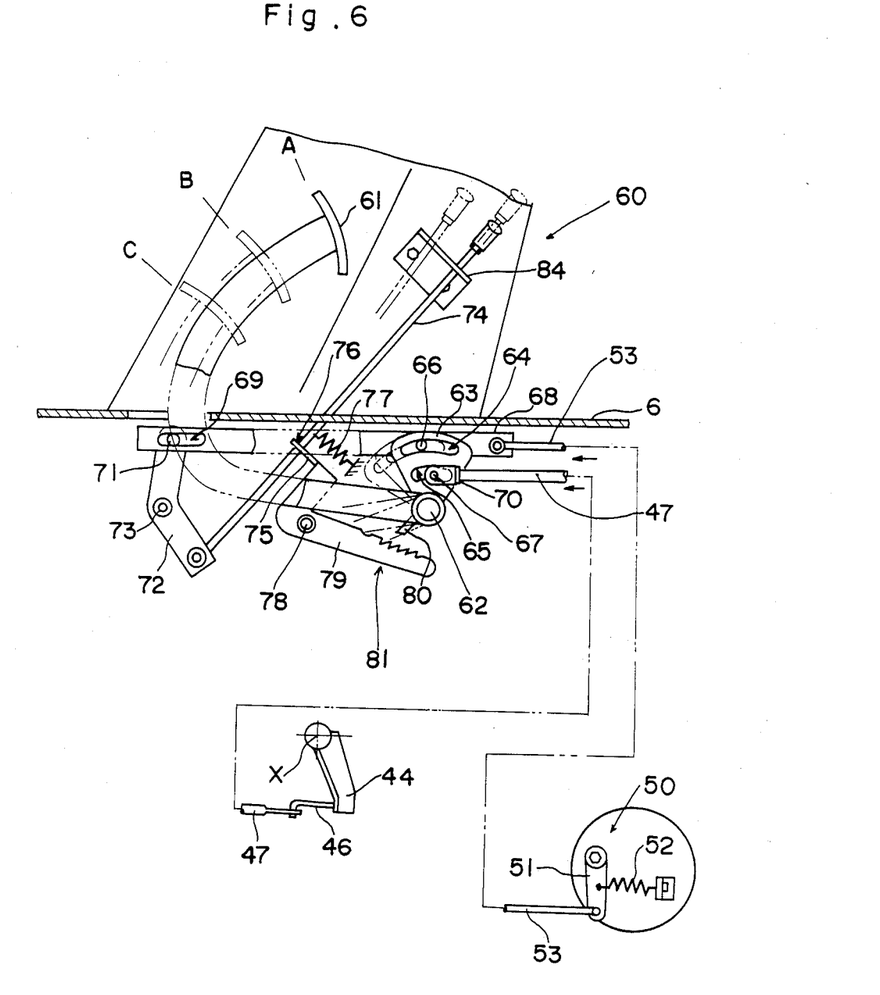
FIG. 6 is a schematic view of a principal portion of a clutch and brake operating mechanism.

The clutch and brake control mechanism 60 will particularly be described next. Referring to FIG. 6, a clutch and brake pedal 61 is provided on the deck 6 adjacent the left foot of the driver seated on the driver's seat 5. When the pedal 61 is depressed from a home position A to a first depth B shown by an alternate long and short dash line, the clutch mechanism 40 is shifted to the disengaged position. A further depression of the pedal 61 to a second depth C shown by an alternate long and two short dashes line causes the brake mechanism 50 to apply the brakes.

More particularly, the clutch and brake control mechanism 60 includes an oscillation plate 63 which oscillates on a rotary shaft 62 when the clutch and brake pedal 61 is depressed. The plate 63 defines two arcuate slots 64 and 65 engaged by pins 66 and 67 attached to a brake link plate 68 and a clutch link plate 70, respectively. The depression of the pedal 61 to the first depth B moves the clutch link plate 70 by means of the pin 67, which pulls the connecting member 47 constituting a clutch operating rod connected to one end of the clutch link plate 70, in a direction shown by an arrow in FIG. 6. Then the tension pulley 41 of the clutch mechanism 40 is retracted to the disengaged position. The depression of the pedal 61 to the second depth C moves the brake link plate 68 by means of the pin 66, which pulls the connecting member 53 constituting a brake operating rod connected to one end of the brake link plate 68, in a direction shown by another arrow in FIG. 6. Then the brake mechanism 50 applies the brakes.

Further, the brake link plate 68 defines a slot 69 at the other end thereof which is engaged by a pin 71 attached to one end of a link plate 72 oscillatable on a rotary shaft 73. The other end of the link plate 72 is connected to an end of a hand lever 74 provided along with the clutch and brake pedal 61 adjacent the driver's seat 5. By pulling up the hand lever 74 in a direction shown by an arrow Ay, the brake link plate 68 is moved in the direction shown by the arrow through an operation line independent of the operation line leading from the pedal 61. Thus, the brake mechanism 50 is directly caused through the brake correction member 53 to apply the brakes. This hand lever in a normal position is urged toward the seated driver by a spring 77.

A link plate 75 is provided at an intermediate position of the hand lever 74, the link plate 75 defining a slot 76 through which the hand lever 74 extends. An end of the link plate 75 is connected to a free end of an L-shaped locking plate 79 having a pivotal axis 78 at an intermediate position thereof. The other free end of the locking plate 79 defines sawteeth on an upper face thereof. The locking plate 79 and a claw 80 projecting from a bottom face of the oscillation plate 63 constitute a lock mechanism 81. That is, by forwardly shifting the hand lever 74 with the clutch and brake pedal 61 depressed to the second depth C, the locking plate 79 and the claw 80 are brought into engagement whereby the pedal 61 is locked to the second depth C.

For parking the lawn tractor by using the above clutch and brake control mechanism 60, the clutch and brake pedal 61 is depressed to the second depth C and the hand lever 74 is shifted forwardly and this engages the locking plate 79 and the claw 80 of the lock mechanism 81, whereby the pedal 61 is prevented from returning and the brake mechanism 50 is retained in the operative position. At this time the clutch mechanism 40 of course is in the disengaged position. This braked state is easily lifted by depressing the pedal 61 again whereupon the locking plate 79 and the claw 80 disegage from each other permitting the hand lever 74 to return under the urging force of the spring 77.

For starting the tractor on an uphill road, the hand lever 74 is pulled up to directly place the brake mechanism 50 in the operative position, and thereafter the pedal 61 is returned from the second depth C through the first depth B to the home position A to engage the clutch while gradually returning the hand lever 74 to an original position. This engages the clutch mechanism 40 while the brake mechanism 50 is retained in the operative position.

The clutch mechanism 40 may be maintained in the engaged position while the brake mechanism 50 is maintained inoperative, by depressing the pedal 61 to the first depth B and engaging the locking plate 79 and the claw 80 of the lock mechanism 81.

Figure 7:
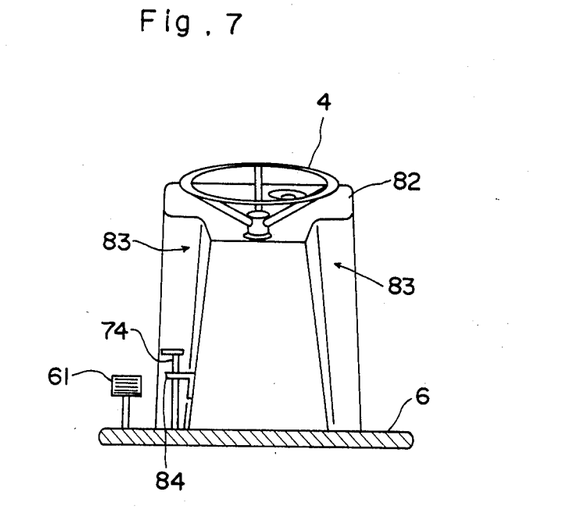
FIG. 7 is a perspective view of a driver's section of the tractor.

As shown in FIG. 7, the clutch and brake pedal 61 and the hand lever 74 are disposed in one of right and left lateral recesses 83 of a panel 82 erected on the decks 6. This arrangement has the advantage of securing a large space for the feet of the driver on the decks 6. Furthermore, the hand lever 74 may easily be gripped with the hand for good operability by arranging that the panel 82 defining the right and left recesses 83 has an upwardly converging shape to provide an upwardly enlarging space between the panel 82 and the hand lever 74 guided at an upper portion thereof by a guide plate 84.

Figure 8:
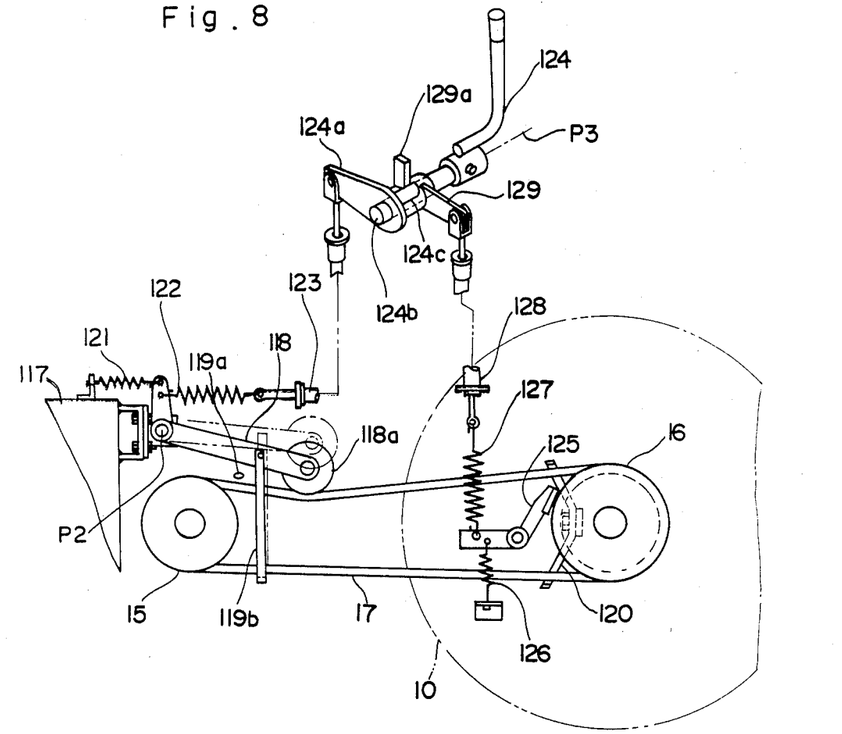
FIG. 8 is a schematic view showing a tension clutch and a belt pressing device in a drive transmission for operating a working implement.

A drive transmission system for the working implement will be described next. As shown in FIG. 8, the lower output pulley 15 of the engine 2 is operatively connected through the belt 17 to the input pulley 16 of the cutting unit 10. A tension clutch is provided comprising a tension arm 118 pivotable on a vertical axis p2 of a frame 117 attached to the tractor body adjacent the engine 2, and a tension pulley 118a attached to a free end of the tension arm 118. Further, a stationary belt pressing member 119a is provided adjacent the output pulley 15 and at a side of the belt 17 where the tension arm 118 is disposed. The tension arm 118 carries fixed thereto a hook type belt pressing member 119b defining a hook at an extreme end lying at an opposite side of the belt 17. The hook type belt pressing member 119b has such a length that the hook at the extreme end thereof is out of contact with the belt 17 when the tension arm 118 assumes a clutching position. The input pulley 16 of the cutting unit 10 also is provided with a stationary belt pressing member 120 which comprises a v-shaped member having projections at opposite ends thereof.

A control system for controlling the tension arm 118 will be discribed next. As shown in FIG. 8, the tension arm 118 is urged by a spring 121 toward a declutching position and is operatively connected Lo a clutch arm 124a of a clutch lever 124 through a spring 122 having a stronger urging force than the spring 121 and through a release wire 123. The clutch lever 124 is pivotable and lockable on a horizontal axis P3 in the driver's section 7.

Figure 9:
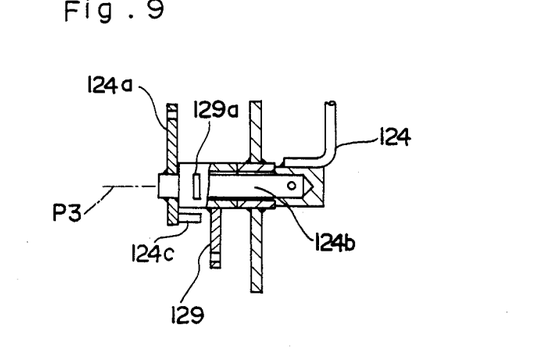
FIG. 9 is a partly broken away sectional view of a support portion of a clutch lever for operating the tension clutch.

Adjacent the input pulley 16 of the cutting unit 10 there is provided a pulley brake 125 for stopping rotation of the cutting unit 10 when the clutch is disengaged. The pulley brake 125 is urged by a spring 126 to an inoperative position, and is operatively connected to the clutch lever 124 through a spring 127 having a stronger urging force than the spring 126 and through a release wire 128. As shown in FIGS. 8 and 9, its interlocking structure includes a brake arm 129 pivotably attached to an axis 124b carrying the clutch lever 124 and the clutch arm 124a at opposite ends thereof, and the brake arm 129 is connected at a free end thereof to the release wire 128.

When the clutch lever 124 is shifted to a position to disengage the tension clutch, the tension arm 118 leaves the belt 17. At the same time the belt pressing member 119b moves inwardly of a belt track and cooperates with the opposite stationary belt pressing member 119a to hold the belt 17 in an arcuate form of greater diameter than the output pulley 15. In parallel therewith, a pin 124c projecting from an inside face of the clutch arm 124a presses a control piece 129a of the brake arm 129 to a braking position, whereby the pulley brake 125 acts on the input pulley 16 of the cutting unit 10 to stop the input pulley 16 promptly.

The above construction may be modified such that the tension arm 118 and the pulley brake 125 are operatively interconnected by a release wire to permit the tension clutch and the pulley brake to operate together.

Although not shown in the drawings to avoid complication of the drawings, the propelling drive transmission system may advatangeously include belt pressing members similar to those described above for breaking drive transmission at times of clutch disengagement.

What is claimed is:

1. A drive transmission structure for a tractor comprising an engine output shaft (13), a transmission (19), and a belt drive system for transmitting power from the engine output shaft (13) to the transmission (19), the belt drive system including a belt type stepless change speed mechanism (18) having a split pulley assembly (32) provided with two split pulley sections, and swing means for swinging the split pulley assembly (32) toward the engine output shaft (13) and the transmission (19), a first belt means (21) for transmitting the power from the engine output shaft (13) to the split pulley assembly (32), a second belt means (22) for transmitting the power from the split pulley assembly (32) to the transmission (19), a tension pulley type clutch mechanism (40) adapted to act on one of the first belt means (21) and the second belt means (22), and a first control means (100) for controlling the belt type stepless change speed mechanism (18);

wherein the split pulley assembly (32) includes a rotary shaft (29) attached to the swing means (28), two outer pulley members (30A, 30B) fixed to the rotary shaft (29), and an inner pulley member (31) slidable on the rotary shaft (29) between the two outer pulley members (30A, 30B), the two outer pulley members in combination with the inner pulley member defining the split pulley section;

wherein the tension pulley type clutch mechanism (40) includes an arm (42) swingable on an axis (Y) parallel to the rotary shaft (29), and a tension pulley (41) attached to the arm (42); and wherein the swing means (28) of the split pulley assembly (32) is swingable on the axis (Y) on which the arm (42) of the tension pulley type clutch mechanism (40) is swingable.

2. A drive transmission structure as claimed in claim 1 wherein the arm (42) carries a belt pressing member adjacent the split pulley assembly (32) and outwardly of a belt track, the belt pressing member being movable inwardly of the belt track to stop the power transmission when the tension pulley (41) moves to a declutching position.

3. A drive transmission structure as claimed in claim 1 wherein the first control means (100) includes manual change speed control means, and a link mechanism (102) for transmitting a shift of the manual change speed control means to the swing means to swing the swing means.

4. A drive transmission structure as claimed in claim 3 wherein the manual change speed control means includes a manual change speed controller (101) having an engaging member (104), and a guide member (105) defining a plurality of receiving recesses (106) arranged along a direction of movement of the manual change speed controller (101), the engaging member (109) being resiliently engageable with the receiving recesses (106) of the guide member (105) under an operating force exceeding a predetermined force and retractable to a position out of engagement with the receiving recesses (106).

5. A drive transmission structure for a tractor comprising an engine output shaft (13), a transmission (19) including a brake mechanism (50), and a belt drive system for transmitting power from the engine output shaft (13) to the transmission (19), the belt drive system including:

a belt type stepless change speed mechanism (18) having a split pulley assembly (32) provided with two split pulley sections, and swing means for swinging the split pulley assembly (32) toward the engine outtput shaft (13) and the transmission (19);

a first belt means (21) for transmitting the power from the engine output shaft (13) to the split pulley assembly (32);

a second belt means (22) for transmitting the power from the split pulley assembly (32) to the traansmission (19);

a tension pulley type clutch mechanism (40) adapted to act on one of the first belt means (21) and the second belt means (22); and a clutch and brake control mechanism (60) for controlling the brake mechanism (50) and the tension pulley type clutch mechanism (40);

wherein the clutch and brake control mechanism (60) includes a clutch and brake pedal (61) adapted to disengage the clutch mechanism (40) when depressed to a first depth (B) and to actuate the brake mechanism (50) when depressed to a second depth (C), and a lock mechanism (81) for engaging and locking the pedal (61) against return when the pedal (61) is depressed to the second depth (C), the lock mechanism (81) being switchable by means of a hand lever (74); and the brake mechanism (50) being directly operable by a movement of the hand lever (74) in a direction different from a direction in which the hand lever (74) is moved for switching the lock mechanism (81).

* * * * *